July 12, 1932.  G. E. HAWLEY  1,866,888

SAWING MACHINE

Filed March 11, 1931   3 Sheets-Sheet 1

INVENTOR
George E. Hawley,
BY
ATTORNEYS

July 12, 1932.  G. E. HAWLEY  1,866,888
SAWING MACHINE
Filed March 11, 1931  3 Sheets-Sheet 2

INVENTOR
George E. Hawley,
BY
ATTORNEYS

July 12, 1932.  G. E. HAWLEY  1,866,888
SAWING MACHINE
Filed March 11, 1931   3 Sheets-Sheet 3

INVENTOR
George E. Hawley,
BY
ATTORNEYS

Patented July 12, 1932

1,866,888

UNITED STATES PATENT OFFICE

GEORGE E. HAWLEY, OF DETROIT, MICHIGAN, ASSIGNOR TO MASTER WOODWORKER MFG. CO., OF DETROIT, MICHIGAN, A CORPORATION OF MICHIGAN

SAWING MACHINE

Application filed March 11, 1931. Serial No. 521,623.

The present invention pertains to a novel sawing machine designed particularly for various adjustments in order that it may be useful in performing several kinds of sawing operations.

It is well known in the art that in the sawing of wood, the saw may be disposed over the work in cutting against the grain, while in ripsawing or cutting with the grain, it is preferable that the center of the saw be disposed below the work. Adjustable saws of present construction have a saw blade normally mounted over the work, with no provision for bringing the center of the blade beneath the work in ripsawing. The principal object of this invention, therefore, is to provide a saw construction enabling the last mentioned adjustment.

The object of the invention is accomplished principally by providing a vertically adjustable support on which a saw carriage is horizontally slidable and further angularly adjustable in a horizontal plane so that the axis of the carriage may be set in two horizontal positions at different angles to one of the axes of the table. The means for maintaining these adjustments, is preferably such that the two alternative positions are at right angles to each other. Thus, the saw is adjustable in two positions at right angles to each other with reference to the grain of the wood mounted on the table. By virtue of the vertical adjustability of the saw, the latter may be brought over the table in one of the aforementioned adjustments, as when used for cross cutting, and below the table in the other adjustment, as when used for ripsawing, in keeping with the above stated object of the invention.

The invention further embodies means for adjusting the plane of the saw at various angles to the vertical and also novel features of construction in the various devices for adjusting the saw vertically and horizontally with respect to the table.

The invention is fully disclosed by way of example in the following description and in the accompanying drawings in which—

Reference to these views will now be had by use of like characters which are employed to designate corresponding parts throughout.

Figure 1:
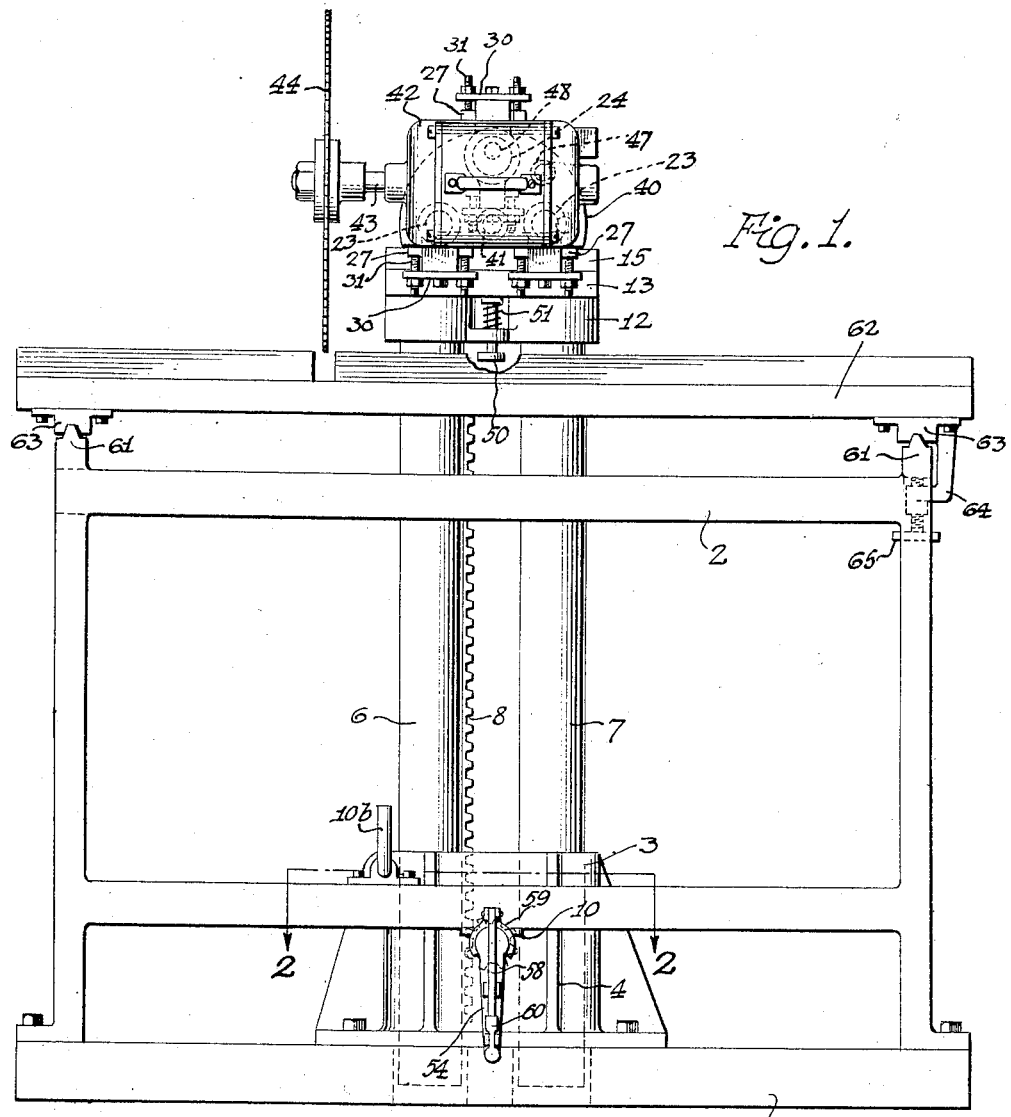
Figure 1 is a front elevation of the machine.

The machine is built upon a base 1 to which is secured a table member 2 elongated in one direction as shown more clearly in Figure 1. Upon the base 1 and behind the table 2 is secured a double upright bearing member 3 reinforced by webs 4 and split at one end as indicated by the numeral 5 in Fig. 2. Vertical posts 6 and 7 are slidably mounted in the sockets of the bearing 3, extending also into the base 1 as shown in Fig. 1, for a purpose which will presently be described.

Figure 2:
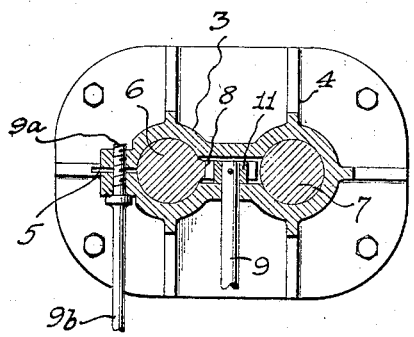
Fig. 2 is a section on the line 2—2 of Fig. 1.

The post 6 has a longitudinal series of rack teeth 8 formed thereon and directed preferably towards the other post 7 as may be seen in Fig. 2. Between the posts 6 and 7, the bearing member 3 rotatably supports one end of a shaft 9, the other end of which is held in a bearing 10 carried by the table as shown more clearly in Figs. 1 and 3. The first mentioned end of the shaft 9 carries a pinion 11 disposed within the bearing member 3 between the posts 6 and 7 and meshing with the rack teeth 8.

A head 12 is secured in common to the upper ends of both posts 6 and 7, thereby securing the posts together. The upper end of the head is formed as a circular member 13 with angle graduations 14.

Figure 4:
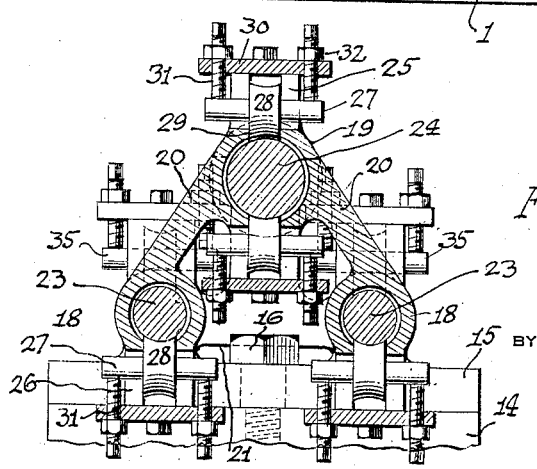
Fig. 4 is a section on the line 4—4 of Fig. 3.

The member 13 serves to support a saw carrier which includes a circular base plate 15 pivotally mounted in concentric relation upon the member 13 by means of a stud 16 as clearly shown in Fig. 4. The peripheral wall of the base plate 15 carries an index point 17 co-operating with the graduations 14 to indicate the angular relation of the saw carrier to the head 12.

Figure 3:
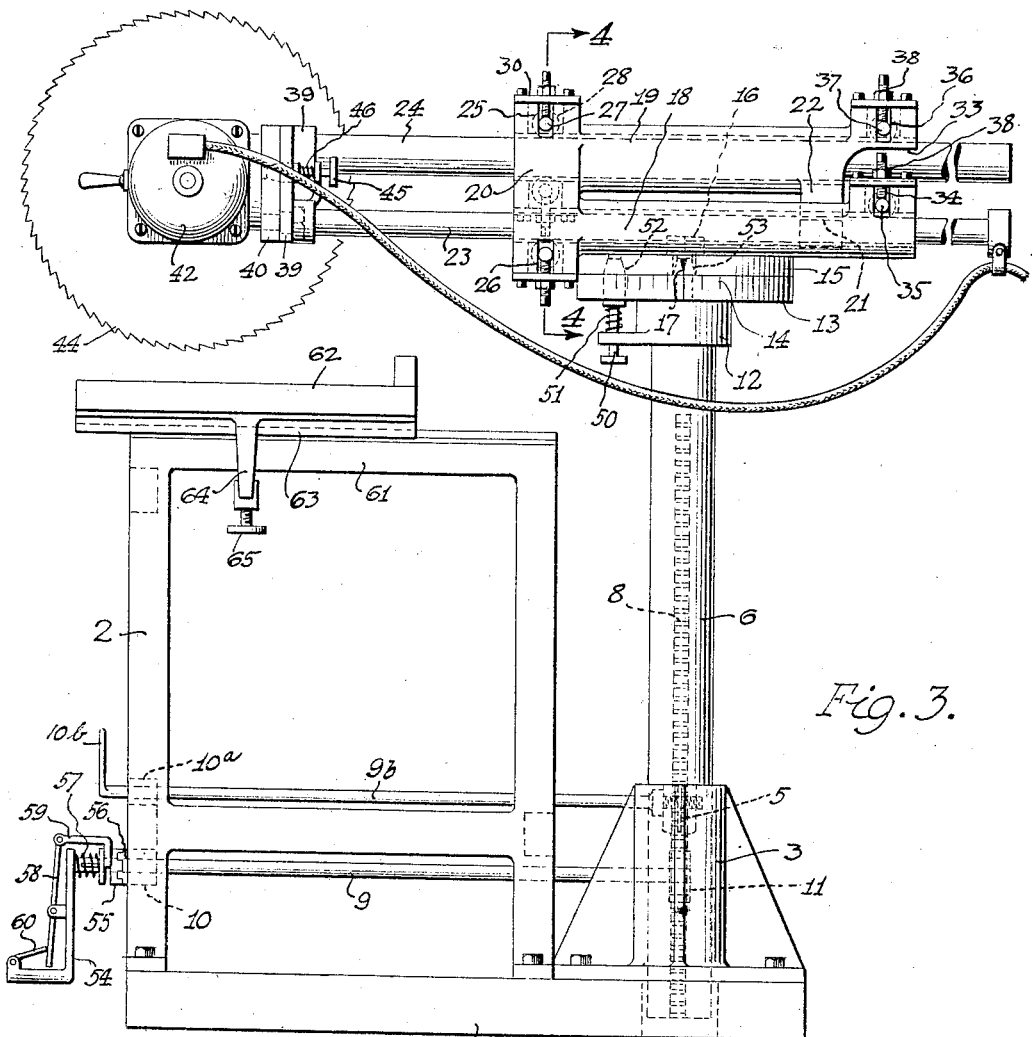
Fig. 3 is a side elevation.

A pair of tubular guide members 18 are formed as a part of the base plate 15 and have their axes lying in a common horizontal plane. The saw carrier further includes another tubular guide member 19 positioned centrally above the members 18 and joined to the latter by lateral and angular struts 20 at one end thereof as shown in Figs. 3 and 4. The parts are further joined together near the other end by a tie 21 connecting the lower members 18 and having a stem 22 extending upwardly and merging into the member 19.

The carrier supports a saw carriage comprising supporting rods 23 passed somewhat loosely through the lower guide members 18, and another such rod 24 of larger diameter passed in like fashion through the upper guide 19. Adjustable roller bearings are provided for the rods 23 and 24, and for the purpose of identification and description, it will be assumed that the struts 20 are at the forward end of the carrier and the ties 21, 22 are near the rear end.

The forward end of the carrier is slotted from its upper edge into the guide 19 as indicated by the numeral 25 and is slotted twice from the lower edge into the members 18 as indicated by the numeral 26. A trunnion 27 carrying a loose concave roller 28 is inserted into each of the slots, and the members 18 and 19 are also slotted at 29 to permit the rollers to engage the upper and lower surfaces of the rod 24 and the lower surface of each rod 23. The trunnions are held in position by adjustable clamps, each constituting a plane 30 bolted to the top and bottom of the carrier, as the case may be, with a pair of threaded studs 31 engaging each trunnion 27 at both sides of its roller 28 and locked in adjusted positions by nuts 32.

In the rear end of the saw carrier is formed a recess 33 whereby slots 34 may be cut in such a manner as to permit roller assemblies 35 similar to those described to rest upon the lower rods 23. In like manner, a slot 36 is cut from the upper edge of the carrier at its rear end to admit a roller assembly 37 to rest upon the upper rod 24. The assemblies 35 and 37 are adjustably retained by clamping devices similar to those already described and indicated generally by the numeral 38.

The forward ends of the rods 23 and 24 are united by a common head 39 to which is attached a motor base plate 40 in concentric relation by means of a central pivot stud 41. The base plate 40 supports a conventional electric motor 42 having a shaft 43 carrying a circular saw 44 at one end thereof and normally lying in a vertical plane.

The head 39 carries a spring detent 45 normally urged against the plate 40 by means of the spring 46. The base plate 40 has two apertures 47 and 48 adapted to receive the detent. When the detent is in the aperture 47, the saw is in a vertical plane as illustrated, and when the detent is in the aperture 48, the saw is held at a given angle to the horizontal corresponding to the angle between the apertures and preferably 45°. It will be obvious that other apertures may be provided at various positions on the base plate for maintaining the saw at any desired angle to the horizontal or vertical.

In like manner the head 12 carries a detent 50 urged by a spring 51 towards the plate 15. The latter is formed with two apertures 52 and 53 at 90° apart. When in the aperture 52, the detent 50 holds the saw carrier in the position illustrated, or transversely of the table 2, and when in the other aperture 53 holds the saw carrier lengthwise of the table for a purpose which will presently appear.

The free end of the shaft 9 carries a crank or handle 54 and also a clutch member 55 splined thereon. The bearing 10 is formed with a complementary clutch face 56, whereby the shaft is held against turning when the parts 55 and 56 are in engagement. A spring 57 surrounds the shaft 9 between the handle and the member 55, thereby normally tending to lock the clutch. A lever 58 is pivoted to the handle and is in turn pivoted to a clutch shifter 59 engaging the clutch element 55. Thus, when the free end of the lever is pressed inwardly towards the handle, the clutch is disengaged. Another lever 60 pivoted to the handle engages the lower end of the lever 58 and may be operated to effect disengagement of the clutch. With the clutch disengaged, rotation of the handle raises or lowers the posts 6 and 7 and saw carrier through the rack 8 and pinion 11. After adjustment of the saw carrier in its vertical position, the gearing is locked by the clutch 55, 56. To further hold the posts 6 and 7 against slipping, a screw 9a is threaded through the bearing across the slot 5 and is extended in the form of a shaft 9b journaled in the bearing 10a carried by the table. The free end of this shaft is in the form of an angular handle 10b whereby the shaft may readily be turned to clamp the bearing structure 3 around the posts 6 and 7.

The upper transverse edges of the table 1 are formed with guides 61 co-operating with a table top or work support 62 having shoes 63 slidably engaging the members 61. The table top further carries an angle arm 64 with a clamping screw 65 extending beneath one of the rails 66 of the table, whereby the top 62 may be secured in any desired position transversely of the table.

Figure 5:
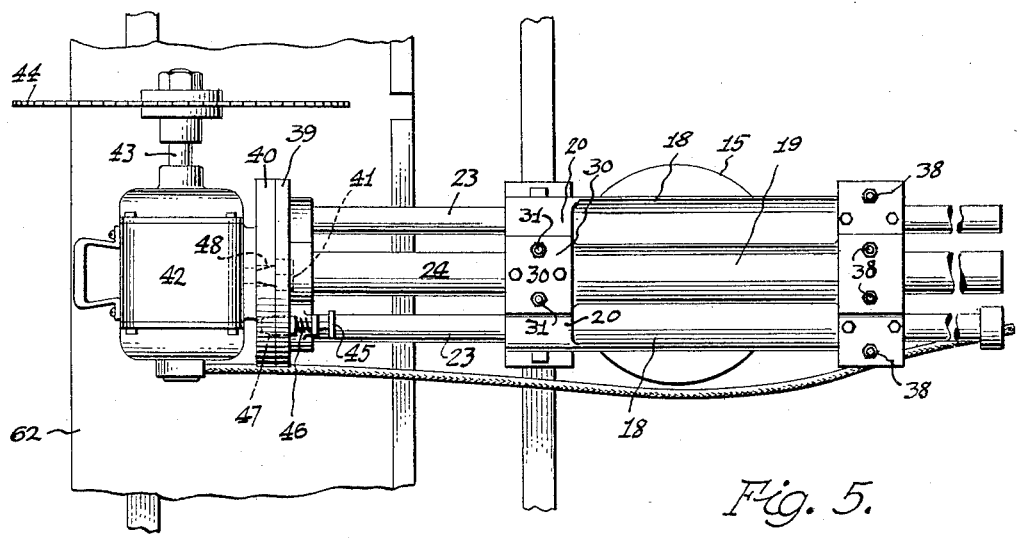
Fig. 5 is a plan view.

In Figs. 1, 3 and 5, the saw is shown in position for cutting across the grain. In this operation it is preferable to have the saw blade over the work.

When used as a ripsaw, it is preferable that this saw blade be disposed beneath the work. Such an adjustment is not ordinarily possible but is provided by the invention herein described. In order to bring the saw blade beneath the work, the detent 50 is first released from the base 15 to permit the saw carrier to be swung through an angle of 90° or until the detent springs into the aperture 53. The length of the motor shafts 43 between the motor housing and the saw blade is sufficient to bring the blade into a plane which lies between the longer edges of the table, or the support 62 may be slid over the saw. By vertical adjustment of the posts 6 and 7, and horizontal adjustment of the rods 23 and 24, the saw blade may be inserted between the legs of the table and adjusted to extend upwardly through the unobstructed top plane of the table. The work support 62 has a longitudinal slot 67 to accommodate the saw blade in this position, and the work is moved along the work support against the blade.

It will be seen in Fig. 3 that the forward roller bearings engage the lower surfaces of the rods 23 and 24, thereby providing a supporting fulcrum for the rods under the action of the weight of the motor 42 carried thereby. The rear bearings however engage the upper surfaces of the rods, thereby opposing the tilting tendency induced by the weight of the motor. The bearings thus arranged provide a suitable anti-friction device for the longitudinal movement of the rods, regardless of the weight of the motor.

Figure 6:
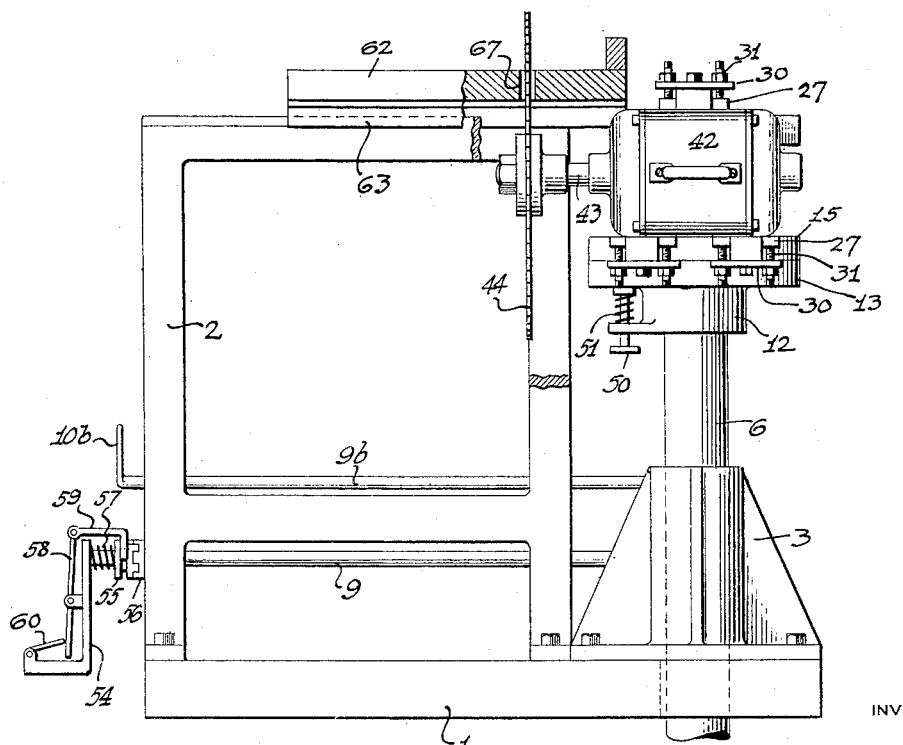
Fig. 6 is a detail side elevation, similar to Fig. 3, showing the saw adjusted to a position beneath the table.

With the device adjusted as in Figure 6, it is available for cross cutting and rip sawing, and in this respect the vertical adjustability of the posts 6 and 7 may be omitted. In cross cutting, the work is laid upon the support 62, and the saw blade 44 is moved against the work by causing the rods 23 and 24 to slide in their bearings. For rip sawing, the work is laid upon the support 62 and pushed against the saw blade 44.

Although a specific embodiment of the invention has been illustrated and described, it will be apparent that various alterations in the details of construction may be made without departing from the scope of the invention as indicated by the appended claims.

What I claim is:—

1. A sawing machine comprising a table, a support vertically slidable and adjustable adjacent said table, a carrier rotatably mounted on said support for angular adjustment in a horizontal plane, a carriage horizontally slidable in said carrier, and a saw carried by said carriage, whereby said saw may be positioned above or below the top of said table.

2. A sawing machine comprising a table, a support vertically slidable and adjustable adjacent said table, a carrier rotatably mounted on said support for angular adjustment in a horizontal plane, a carriage horizontally slidable in said carrier, a detent cooperating with said support and carrier to hold the carriage alternatively in two positions at substantially right angles to each other, over the table in one position and adjacent the table in the other position, and a saw carried by said carriage and offset therefrom to extend within the vertical boundary planes of said table when the carrier is in the latter position, whereby the saw may be placed over the top of the table in the first position and at least partially below the top of the table in the other position.

3. A sawing machine comprising a table, a support vertically slidable and adjustable adjacent said table, a carrier rotatably mounted on said support for angular adjustment in a horizontal plane, a carriage horizontally slidable in said carrier, a detent cooperating with said support and carrier to hold the carriage alternatively in two positions at substantially right angles to each other, over the table in one position and adjacent the table in the other position, a motor carried by said carriage, a shaft extending from said motor laterally of said carriage, a saw mounted on said shaft and offset from the carriage to extend within the vertical boundary planes of said table when the carrier is in the latter position, whereby the saw may be placed over the top of the table in the first position and at least partially below the top of the table in the other position.

4. A saw machine comprising a table, a saw support, a saw carried thereby, said support being adjustable in a vertical plane extending above and below the top of said table and also adjustable through an angle of 90° about a vertical axis, whereby said support may be adjusted to bring said saw wholly above or wholly below said table.

5. A saw machine comprising a table, a saw support, a saw carried thereby, said support being adjustable in a vertical plane extending above and below the top of said table and also adjustable through an angle of 90° about a vertical axis, whereby said support may be adjusted to bring said saw wholly above or wholly below said table, and a slidable work support on said table.

In testimony whereof I affix my signature.

GEORGE E. HAWLEY.